Feb. 2, 1932. J. V. LAMBERT 1,843,567

PULLEY AND SHAFT COUPLING

Filed Nov. 22, 1928

INVENTOR.
Joseph V. Lambert
BY Erwin, Wheeler & Woolard
ATTORNEYS

Patented Feb. 2, 1932

1,843,567

UNITED STATES PATENT OFFICE

JOSEPH V. LAMBERT, OF MILWAUKEE, WISCONSIN

PULLEY AND SHAFT COUPLING

Application filed November 22, 1928. Serial No. 321,055.

This invention relates to improvements in yieldable pulley and shaft couplings.

It is the object of the invention to provide a novel and improved form of coupling which may be employed for mounting a pulley upon a shaft or for connecting a pulley to a shaft, or for connecting two shafts to each other, the connection being such that it may readily be separated and re-established simply by moving the parts axially with respect to each other.

It is an important purpose of the invention to provide a retaining device for holding the various coupling members unitarily in their proper relative positions at such times as they are not operative for coupling purposes, thus facilitating the simultaneous application of all such members to complementary parts to re-establish the coupling.

In the drawings—

Like parts are identified by similar reference characters throughout the several views.

Figure 1:
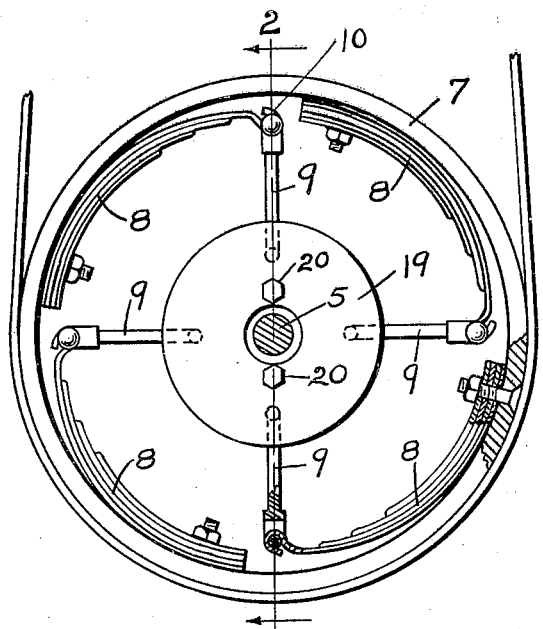
Figure 1 is an end elevation of a pulley structure embodying this invention.
Figure 2:
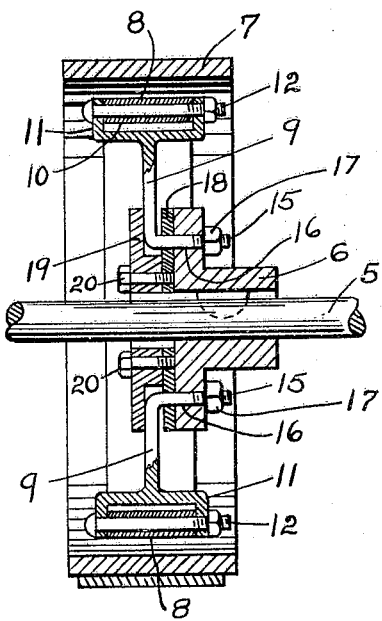
Figure 2 is a section taken in the plane indicated by the line 2—2 in Figure 1.

Referring to the construction illustrated in Figures 1 and 2, it will be noted that the shaft 5 carries a coupling hub 6 which is permanently keyed thereto. The pulley 7 is similar to that illustrated in Patent No. 1,495,181, to Holzhausen, in that it is provided in its interior periphery with leaf springs 8. At this point, however, the resemblance ceases, for the present device has rigid, or substantially rigid, links 9 connecting the ends of the springs with the fixed hub 6. Each spring is provided at 10 with an eye and each of the links 9 terminates in a clevis 11 having a clevis pin at 12 extending through the eye of the spring. By this arrangement the links are flexibly joined to the respective springs although the links themselves are preferably rigid connecting rods.

Each link or connecting rod 9 is provided at its inner end with an axially extending pivot portion 15, all of such portions being receivable into suitable openings 16 in the coupling hub 6 which is permanently mounted on shaft 5. The arrangement is preferably such that the connecting rods or links 9 will be maintained under sufficient tension to hold the free ends of springs 8 clear of the inner periphery of the pulley to permit the desired degree of flexibility in a radial direction. Even without this feature, however, it will be observed that the springs will function to take up torsional shock between the pulley and shaft, due to the fact that any tendency for the pulley to rotate with respect to the shaft and the coupling hub 6 thereon will necessarily draw the links or connecting rods 9 laterally from their normal radial positions and will thus distort the springs 8. Obviously therefore all power transmitted between the pulley 7 and shaft 5 must necessarily be transmitted through the springs which will tend to absorb all shocks between the driving and driven parts.

Figure 3:
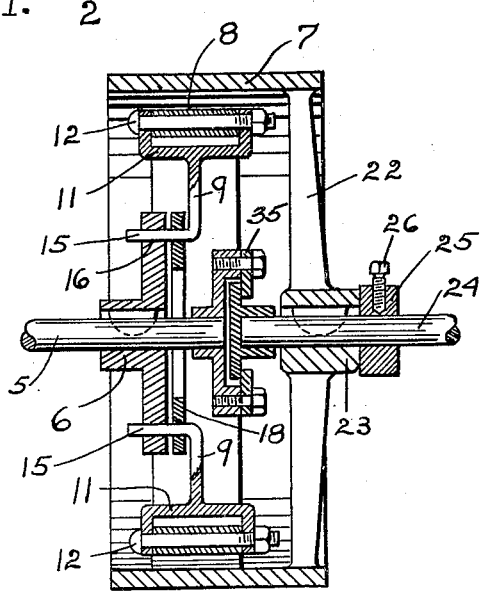
Figure 3 shows a slight modification of the pulley adapting it for use as a shaft coupling and also to other pulley service.

Due to the fact that the links or connecting rods 9 are rigid, it is possible, although not necessary, to dispense with any provision of a separate hub mounting for the pulley upon the shaft. The rigid links or connecting rods 9 coupled, as shown, with the permanent hub 6 and the eyes in springs 8, are quite capable of serving as spokes for the mounting of the pulley. If desired, however, separate spokes and a separate hub may be provided, as shown in Figure 3.

A great advantage of the employment of relatively rigid links or connecting rods at 9 is found in the ease with which the device may be assembled and disassembled. As illustrated in Figures 1 and 2, the pulley is held to the permanent hub member 6 solely by means of nuts applied at 17 to the pivot portions 15 of the connecting rods. It will be obvious that by merely unscrewing these nuts and pulling the pulley axially it will be possible to withdraw all of the pivot devices 15 simultaneously from the apertures 16 of the permanent hub 6.

In order that coupling may be re-effected with equal facility, I prefer to provide a retaining device for holding the links or connecting rods 9 at all times in their proper relative positions, whether they are engaged with the hub member 6 or not. This retaining device may conveniently comprise a disk 18 having apertures corresponding to the apertures 16 of the hub 6 through which apertures the pivot portions 15 of the connecting rods pass before being engaged in the hub. A complementary disk 19 is bolted at 20 to disk 18 in abutment with the connecting rods 9 whereby to hold such connecting rods normally assembled to the disk 18 which maintains them in their proper positions. When a retaining device such as this is employed, it will obviously be possible at any time to reassemble all of the pivot portions 15 of the several connecting rods 9 to the coupling member 6 simply by axial movement of the pulley along the shaft. The registry of the holes in disk 18 with the holes in the hub member 6 will insure that all of the pivot portions 15 will enter their respective openings in the coupling hub 6 without individual manipulation.

In a coupling between two shafts, it is particularly desirable to provide a means for interrupting and re-establishing power transmission through the coupling. Figure 3 shows how my improved device may be used for these purposes. 5 is the shaft illustrated in Figures 1 and 2 which carries the coupling hub 6 permanently mounted thereon. The pulley 7 differs from that previously described only in the provision of separate spokes 22 uniting in a hub 23 which is keyed to the shaft 24. A slip coupling device of well known form designated generically by reference character 35 holds the shafts 5 and 24 in their proper axial relation while permitting relative rotation between them.

The springs 8 connecting rods 9 with pivoted portions 15, and the retaining ring 18 for holding the connecting rods in their proper relative positions all correspond to the disclosure in Figures 1 and 2. In order, however, to illustrate the fact that for some purposes the nuts 17 are not required, these have been omitted in Figure 3 and for the same reason the complementary disk 19 has been omitted.

A set collar 25 on shaft 24 holds all of the parts properly assembled. In order to release the coupling and interrupt transmission of power between shafts 5 and 24 it is only necessary to unscrew the set screw 26 and to slip the set collar 25 and the pulley 7 with its associated connecting rods and retaining ring 18 axially on shaft 24 until the pin portions 15 of the connecting rods clear the openings 16 in the hub 6. Since the disk 18 maintains the parts in their proper angular relation, it is only necessary to move the parts to the left as viewed in Figure 3 to re-establish a driving connection through the flexible coupling.

It will be obvious that in the constructions illustrated the outer part of the coupling is not only resiliently coupled for the transmission of torque to the inner part of the coupling, but is also so designed that the outer part with its connecting rods may be unitarily coupled and uncoupled by axial adjustment with reference to the inner part of the coupling.

It will further be noted that the outer part of the coupling may either comprise a floating pulley bodily yieldable to an eccentric position with reference to the shaft under spring tension or it may comprise a pulley mounted on the shaft by the ordinary rigid spokes and adapted to yield only in a torsional direction. It will further be noted that the device may comprise either a pulley in which power may be received or delivered through a belt or it may comprise merely a coupling in which power is transmitted from either of two shafts to the other.

I claim:

1. A device of the character described, having an inner part and an outer part, springs connected to one of said parts, and connecting rods attached to said springs and projecting in the direction of the other of said parts, with which said connecting rods are pivotally engaged, the engagement of said connecting rods with said last mentioned part being releasable and said connecting rods being provided with a retaining member adapted to preserve their relative positions upon disengagement from said last mentioned part, whereby to facilitate re-engagement of said connecting rods with said part.

2. In a device of the character described, the combination with inner and outer coupling members, of a set of links yieldably secured to one of said members and detachably engaged with the other, and a retaining means holding the detachably engageable portions of said links in predetermined relative positions for re-engagement with said other member when detached therefrom.

3. In a device of the character described, the combination with inner and outer coupling members, of an anchorage device provided with means detachably securing it in registry with one of said members, and a set of links pivoted to said anchorage device and to one of said members and yieldably spring connected to the other of said members, said anchorage device and links and the member to which said links are spring connected, being unitarily assembled for engagement with and disengagement from the other of said members.

4. In a device of the character described, the combination with a pulley-like rim and leaf springs secured to the inner periphery thereof, of connecting means secured to the free ends of said springs and projecting centrally, an anchorage device to which the centrally disposed ends of said connecting means are pivoted, a hub, and means for detachably securing said anchorage device to said hub, said rim, springs, connecting means, and anchorage device being unitarily assembled for manipulation to and from engagement with said hub.

5. In a device of the character described, the combination with a pulley-like rim having leaf springs in its inner periphery, of substantially rigid connecting rods pivoted to the free ends of said springs, and a central hub to which said connecting rods are pivoted, together with an anchorage device for fixing the relative positions of the free ends of said connecting rods, the latter being detachable from said hub and adapted with said rim and device to comprise a unitarily handled structure.

6. In a device of the character described, the combination with a hub having radially located axially extending apertures, of a set of substantially rigid and normally radially disposed connecting rods having pivotal means respectively engaged in said apertures, a rim, and a set of leaf springs having their respective ends secured to said rim and their free ends respectively connected to said connecting rods, the pivotal means of the several rods being simultaneously disengageable from said apertures upon axial movement between said hub and rim.

7. In a device of the character described, the combination with a hub having radially located axially extending apertures, of a set of substantially rigid and normally radially disposed connecting rods having pivotal means respectively engaged in said apertures, a rim, and a set of leaf springs having their respective ends secured to said rim and their free ends respectively connected to said connecting rods, said means being axially disengageable from said apertures and provided with an anchoring device supporting said means in position for re-engagement with said apertures.

8. In a device of the character described, the combination with a hub having radially located axially extending apertures, of a set of substantially rigid and normally radially disposed connecting rods having pivotal means respectively engaged in said apertures, a rim, and a set of leaf springs having their respective ends secured to said rim and their free ends respectively connected to said connecting rods, said means being axially disengageable from said apertures and provided with an anchoring device supporting said means in position for re-engagement with said apertures, together with mechanism adapted normally to restrain said means against withdrawal from said apertures.

9. In a device of the character described, the combination with a hub having radially located axially extending apertures, of a set of substantially rigid and normally radially disposed connecting rods having pivotal means respectively engaged in said apertures, a rim, and a set of leaf springs having their respective ends secured to said rim and their free ends respectively connected to said connecting rods, said means being axially disengageable from said apertures and provided with an anchoring device supporting said means in position for re-engagement with said apertures, together with a second hub and spokes independently supporting said rim therefrom.

JOSEPH V. LAMBERT.